(12) United States Patent
Leachman

(10) Patent No.: US 9,592,919 B2
(45) Date of Patent: Mar. 14, 2017

(54) ADAPTER FOR AIRCRAFT FLUID TRANSMISSION LINES

(71) Applicant: Bell Helicopter Textron Inc., Fort Worth, TX (US)

(72) Inventor: Joseph Leachman, Keller, TX (US)

(73) Assignee: BELL HELICOPTER TEXTRON INC., Fort Worth, TX (US)

(*) Notice: Subject to any disclaimer, the term of this patent is extended or adjusted under 35 U.S.C. 154(b) by 0 days.

(21) Appl. No.: 14/250,583

(22) Filed: Apr. 11, 2014

(65) Prior Publication Data

US 2015/0291290 A1    Oct. 15, 2015

(51) Int. Cl.
| | | |
|---|---|---|
| F16L 9/00 | (2006.01) | |
| F16L 11/00 | (2006.01) | |
| B64D 37/00 | (2006.01) | |
| B64C 29/00 | (2006.01) | |
| F16L 7/00 | (2006.01) | |

(52) U.S. Cl.
CPC ........ B64D 37/005 (2013.01); B64C 29/0033 (2013.01); F16L 7/00 (2013.01); Y02T 50/44 (2013.01)

(58) Field of Classification Search
CPC ................................. B64D 37/005; F16L 3/08
USPC .................................................. 138/112, 113
See application file for complete search history.

(56) References Cited

U.S. PATENT DOCUMENTS

| | | | | |
|---|---|---|---|---|
| 2,325,616 | A * | 7/1943 | Landweber | 114/244 |
| 3,271,506 | A * | 9/1966 | Horst-Edgar | H01B 11/1856 174/28 |
| 3,789,129 | A * | 1/1974 | Ditscheid | H01B 11/1808 138/113 |
| 4,100,367 | A * | 7/1978 | Netzel | 174/28 |
| 4,754,782 | A * | 7/1988 | Grantham | 138/109 |
| 5,400,828 | A * | 3/1995 | Ziu et al. | 138/113 |
| 5,836,367 | A * | 11/1998 | Calabrese | 138/112 |
| 6,158,475 | A * | 12/2000 | Clemmer | 138/112 |
| 6,161,840 | A * | 12/2000 | Boardman | F16J 15/127 277/593 |
| 6,749,367 | B1 * | 6/2004 | Terry, III | 405/48 |
| 7,322,380 | B2 * | 1/2008 | Opperthauser | 138/149 |
| 7,919,733 | B2 * | 4/2011 | Ellis et al. | 219/544 |
| 2006/0204322 | A1 | 9/2006 | Roiser | |
| 2011/0073207 | A1 * | 3/2011 | Tung et al. | 138/113 |

* cited by examiner

*Primary Examiner* — Vishal Pancholi

(57) ABSTRACT

One example of an aircraft fuel line assembly clamp member includes a c-shaped outer shell and a plurality of spokes. The c-shaped outer shell is sized to be positioned within an outer tube of an aircraft fuel line assembly. The plurality of spokes is arranged on an inner surface of the outer shell. The plurality of spokes protrudes from the inner surface towards a center of the outer shell to define a shape to receive an inner tube of the aircraft fuel line assembly. The plurality of spokes is also spaced apart on the inner surface.

20 Claims, 5 Drawing Sheets

ADAPTER FOR AIRCRAFT FLUID TRANSMISSION LINES

TECHNICAL FIELD

This disclosure relates to aircraft fluid transmission lines, e.g., transmission lines through which aircraft fuel or other aircraft fluid is transported.

BACKGROUND

An aircraft can include one or more fluid lines, e.g., tubing through which an aircraft fluid, e.g., fuel or other aircraft fluid, is transported. In some situations, a fluid line can be an inner tube used to transmit fluid. The inner tube can be surrounded by an outer tube (often referred to as a "sock") to contain fluid in the event that the inner tube leaks, and to direct the leaked fluid to a collection point or separate chamber where it can be safely discharged. In such situations, the outer tube serves as a secondary containment mechanism that directs leaked fluid away from a source of the leak. The outer tube prevents leaked fluid from leaking into the fuselage or onto aircraft components, as the fluid could pose a safety hazard or damage the components or both. The length, weight and material of the inner and/or outer tube can limit an arrangement of the fluid transmission line in the aircraft. For example, if the inner tube and the outer tube have a long length, one or both of the tubes can sometimes sag under the weight of the tubes. Using shorter, more frequent lines to prevent sag only adds additional weight to the tubing system.

SUMMARY

This disclosure describes an adapter for aircraft fluid transmission lines.

Certain aspects of the subject matter described here can be implemented as an aircraft fuel line assembly clamp member. The aircraft fuel line assembly clamp member includes a c-shaped outer shell. The c-shaped outer shell is sized to be positioned within an outer tube of an aircraft fuel line assembly. A plurality of spokes is arranged on an inner surface of the outer shell. The plurality of spokes protrudes from the inner surface towards a center of the outer shell to define a shape to receive an inner tube of the aircraft fuel line assembly. The plurality of spokes is spaced apart on the inner surface.

This, and other aspects, can include one or more of the following features. The clamp member can include a c-shaped inner shell attached to ends of the plurality of spokes near the center of the outer shell. A space between spaced apart edges of the inner shell can be less than an outer diameter of the inner tube of the aircraft fuel line assembly. Corners of the spaced apart edges of the inner shell can be chamfered. An axial width of the inner shell can be substantially equal to an axial width of each spoke of the plurality of spokes. An axial width of the inner shell can be greater than an axial width of each spoke of the plurality of spokes. A space between spaced apart edges of the outer shell can be less than an outer diameter of the inner tube of the aircraft fuel line assembly. Corners of the spaced apart edges of the outer shell can be chamfered. The plurality of spokes can include at least three spokes. The plurality of spokes can be positioned equidistant from each other. The clamp member can include an outer clamp to be positioned on an outer surface of the outer shell over the outer tube of the aircraft fuel line assembly.

Certain aspects of the subject matter described here can be implemented as an aircraft fuel line assembly. The aircraft fuel line assembly includes an inner tube to transport fuel. An outer tube is positioned around the inner tube. The outer tube transports fuel that leaks from the inner tube. A clamp member receives the inner tube and is positioned within the outer tube. The clamp member defines a space to flow the fuel that leaks from the inner tube into the outer tube.

This, and other aspects, can include one or more of the following features. The clamp member can include a c-shaped outer shell. The c-shaped outer shell can be sized to be positioned within an outer tube of an aircraft fuel line assembly. The clamp member can include a plurality of spokes arranged on an inner surface of the outer shell. The plurality of spokes can protrude from the inner surface towards a center of the outer shell to define a shape to receive an inner tube of the aircraft fuel line assembly. The plurality of spokes can be spaced apart on the inner surface. The clamp member can include a c-shaped inner shell attached to ends of the plurality of spokes near the center of the outer shell. A space between spaced apart edges of the inner shell can be less than an outer diameter of the inner tube of the aircraft fuel line assembly. Corners of the spaced apart edges of the inner shell can be chamfered. The plurality of spokes can include at least three spokes positioned equidistant from each other. The clamp member can include an outer clamp to be positioned on an outer surface of the outer shell over the outer tube of the aircraft fuel line assembly.

Certain aspects of the subject matter described here can be implemented as an aircraft fluid transportation line assembly. The aircraft fluid transportation line assembly includes an inner tube to transport aircraft fluid and an outer tube positioned within the inner tube. The outer tube transports aircraft fluid that leaks from the inner tube. A clamp member receives the inner tube and is positioned within the outer tube. The clamp member defines a space to flow the aircraft fluid that leaks from the inner tube into the outer tube. The clamp member includes a c-shaped outer shell sized to be positioned within the outer tube. The clamp member also includes a plurality of spokes arranged on an inner surface of the outer shell. The plurality of spokes protrudes from the inner surface towards a center of the outer shell to define a shape to receive the inner tube. The plurality of spokes is spaced apart on the inner surface.

This, and other aspects, can include one or more of the following features. The clamp member can include a c-shaped inner shell attached to ends of the plurality of spokes near the center of the outer shell. A space between spaced apart edges of the inner shell can be less than an outer diameter of the inner tube. The clamp member can include an outer clamp to be positioned on an outer surface of the outer shell over the outer tube.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an adapter for aircraft fluid transmission lines. Some aircraft fluids (e.g., fuel, hydraulic fluid or other aircraft fluid) are transferred between components and systems through fluid transmission lines. In some cases, the transmission lines include an inner tube through which the fluid flows and an outer tube surrounding the inner tube that acts as a secondary containment (often referred to as a "sock"). In the event that the inner tube leaks fluid, the outer tube captures the fluid and thus prevents the leaked fluid from spilling onto and damaging other components or posing a safety hazard. The outer tube can be positioned at an angle to direct the leaked fluid to a collection point or containment chamber. The outer tube can be made of a light flexible material such as rubber, e.g., to reduce a weight of the fluid transmission line. However, if the inner and outer tubes span a large length, a flexible outer tube can sag, e.g., under its own weight and/or the weight of the fluid that has leaked into the outer tube, which can cause wear on the fluid transmission line. Furthermore, leaked fluid can pool inside a sagging outer tube instead of flowing to the collection point.

This specification describes an adapter that is located between the inner tube and the outer tube of a fluid transmission line to provide support for the outer tube while also providing space for fluid to flow. In some implementations, the adapter can be implemented as a clamp member that includes spokes that secure the inner tube and an outer shell that supports the outer tube. Leaked fluid flows through spaces between the spokes and thus can flow through the outer tube to a collection point. Multiple clamp members can be spaced along a transmission line to provide support for the outer tube over the length of the transmission line. In this manner, the clamp member reduces sagging in the flexible outer tube. Multiple clamp members can enable the use of longer fluid transmission lines, as routings can be secured at greater distances. The clamp member can be used in situations of any transmission line in a system or in applications where a fume-tight enclosure is required. For example, the clamp member could be used in an aircraft fuel transmission line between a fuel tank and an engine or between a fuel tank and an APU. In example implementations described here, the clamp member is implemented in aircraft fuel transmission lines. However, the clamp member can also be used in fluid transmission lines to transport fuel and/or other fluids in other systems in which fluid is transported, e.g., automotive systems (e.g. automobiles, ATVs, motorcycles, etc.), fixed-wing aircraft, submersible systems, marine systems (e.g. personal watercraft, boats, etc.), agricultural systems (e.g. tractors, etc.), power equipment (e.g. generators, lawn mowers, pressure sprayers, etc.), systems that include gasoline engines, or other systems.

Figure 1:
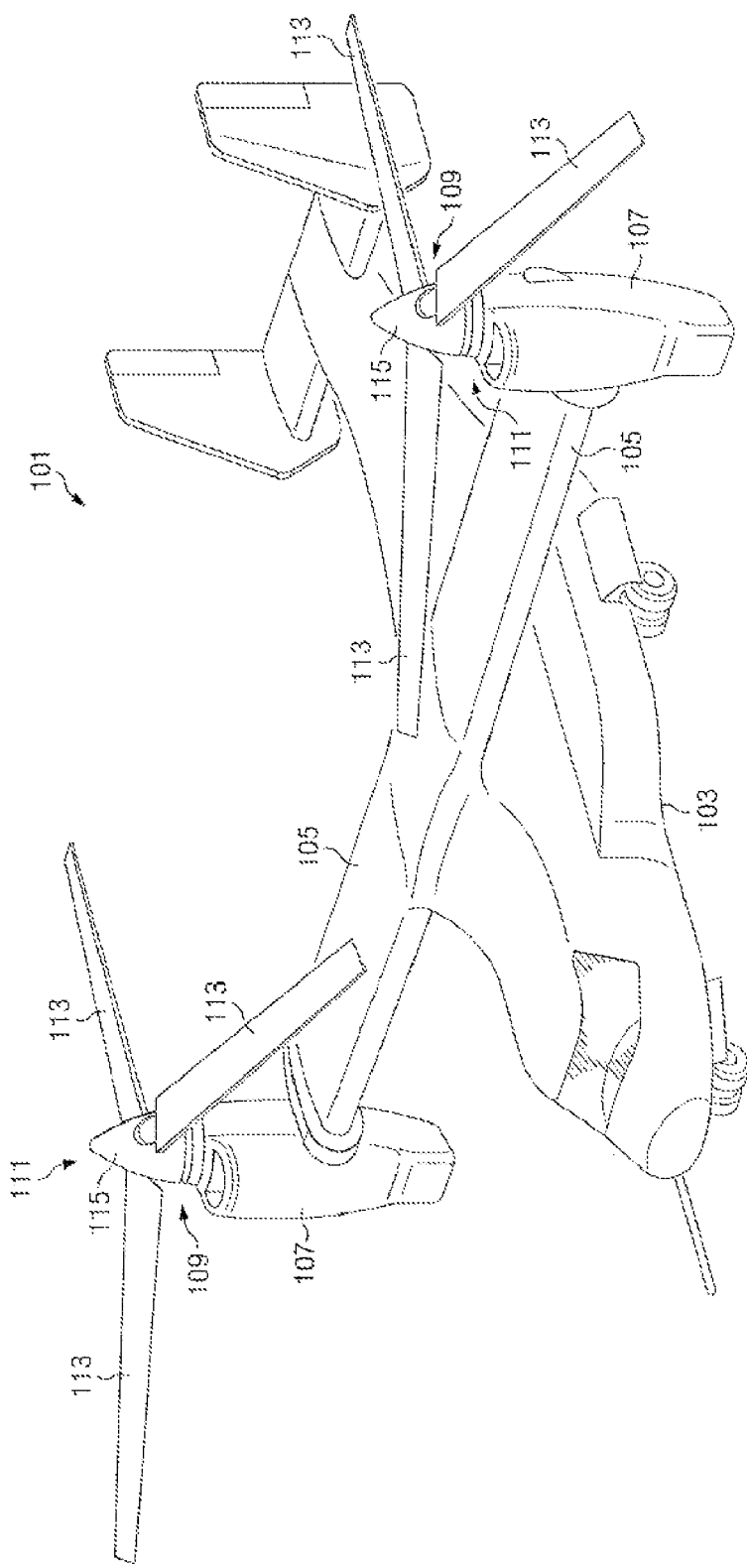
FIG. 1 is a schematic diagram showing an example of a tiltrotor aircraft.

FIG. 1 is a schematic diagram of an example tiltrotor aircraft 101. Aircraft 101 includes a fuselage 103 with attached wings 105. Nacelles 107 are carried at the outboard ends of wings 105 and are rotatable between the helicopter-mode position shown and a forward-facing airplane-mode position (not shown). Nacelles 107 carry engines and transmissions 109 for powering rotor systems 111 in rotation. An engine may be an internal combustion engine, an electrical power source and associated motor, or any other suitable means for powering rotor system 111. Each rotor system 111 is illustrated as having three blades 113. Spinning covers 115 and nacelles 107 substantially enclose transmission 109, obscuring transmission 109 from view in FIG. 1.

Figure 2:
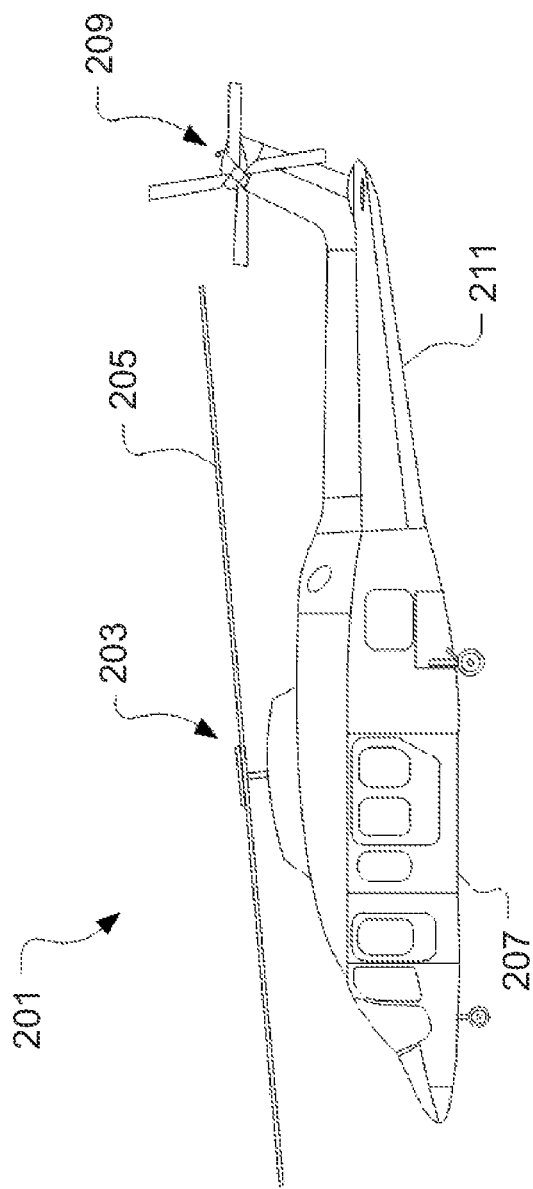
FIG. 2 is a schematic diagram showing an example of a rotorcraft.

FIG. 2 is a schematic diagram of an example rotorcraft 201. Rotorcraft 201 has a rotor system 203 with multiple rotor blades 205. The pitch of each rotor blade 205 can be manipulated in order to selectively control direction, thrust, and lift of rotorcraft 201. Rotorcraft 201 can further include a fuselage 207, anti-torque system 209, and an empennage 211. The clamp member can be implemented in one or more fluid transmission lines, e.g., fuel transmission lines, of the tiltrotor aircraft 101 or the rotorcraft 201 (or both), as described below.

Figure 3:
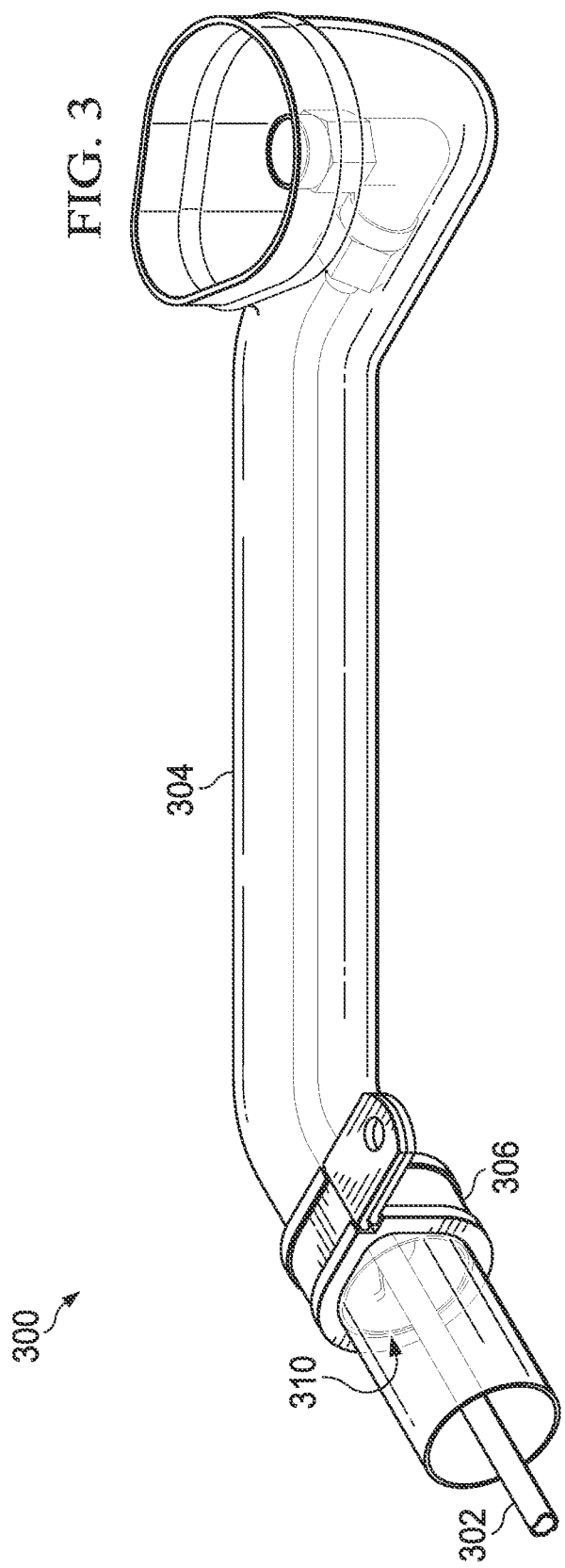
FIG. 3 is a schematic diagram showing a portion of an example fluid line assembly.

FIG. 3 is an illustration of a portion of an example fluid transmission line assembly 300. In some implementations, the fluid transmission line assembly 300 can be included in an aircraft or rotorcraft (such as those shown in FIG. 1 and FIG. 2) to transfer fluid from one system to another. For example, the fluid transmission line assembly 300 can transfer fuel from the fuel tank to the engine, or transfer fuel from the fuel tank to the APU, or transfer another fluid such as hydraulic fluid between two locations. The example fluid transmission line assembly 300 includes an inner tube 302, which is a tube or pipe that conveys fluid. The outer tube 304 is a separate tube that has a diameter greater than the inner tube 302 such that there is a space between the outer surface of the inner tube 302 and the inner surface of the outer tube 304. The outer tube 304 surrounds the inner tube 302 as a secondary containment to contain and isolate any fluid that may leak from the inner tube 302. In some implementations, one or both ends of the outer tube 304 can be connected to a collection point such as a drain, separate chamber, or other collection point (not shown).

The outer tube 304 is supported by clamp member 310. The clamp member 310 is a member located within the outer tube 304, and that is positioned around and supports the inner tube 302. The clamp member 310 defines the space through which the fluid that leaks from the inner tube 302 into the outer tube 304 flows. The clamp member 310 includes multiple spokes 316 (shown in FIG. 4 and FIG. 5) between the inner tube 302 and the outer tube 304. The ends of the spokes 316 are arranged so as to support the inner tube 302. For example, the end of a spoke can abut or be positioned substantially near the end of an adjacent spoke. In this manner, the spokes 316 define a shape to receive the inner tube 302 of the fluid transmission line assembly 300. The spaces between adjacent spokes 316 allow leaked fluid captured in the outer tube 304 to flow through the outer tube 304, e.g., to an adjacent fluid transmission line, to the collection point or another location. The inner tube 302 can be a tube of any suitable length, diameter, or material such as a metal tube with a 0.25 inch diameter. The outer tube 304 can be a flexible material such as rubber or a rigid material such as metal. The clamp member 310 can be made of a flexible material such as nylon or plastic. The clamp member 310 can also be another material such as metal or another material. A metal clamp member 310 can be used in certain environments such as high-temperature environments or other environments. This is one example implementation; other implementations are within the scope of this disclosure.

In some implementations, the outer tube 304 can be secured to a clamp member 310 by an outer clamp 306 that is positioned over the outer tube 304 at the location of the clamp member 310. The outer clamp 306 can be made of plastic or metal, and can be a type of clamp such as a bracket or a ziptie. The outer clamp 306 can also be connected to another part of the aircraft (e.g. the fuselage or other part of the aircraft) to support the fluid transmission line assembly 300. In some implementations, the clamp member 310 and outer clamp 306 can be used to secure the ends of two outer tubes 304 around a single inner tube 302. Each outer tube 304 can partially overlap the clamp member 310 and both outer tubes 304 can be secured by a single outer clamp 306.

Figure 4:
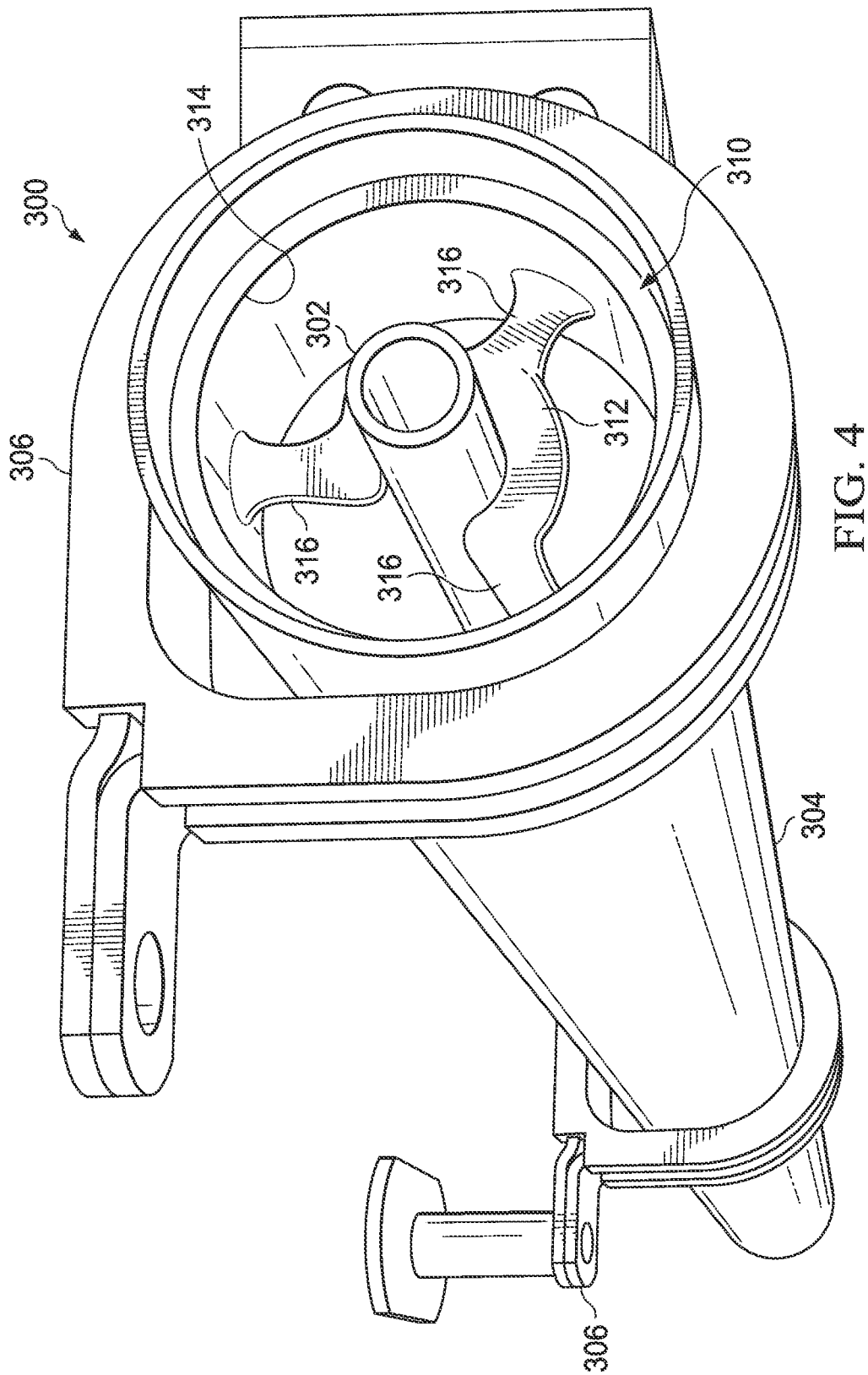
FIG. 4 is a schematic diagram showing a portion of an example fluid line assembly including a clamp member between inner and outer tubes of the fluid line assembly.

FIG. 4 is a schematic illustration of a portion of example fluid transmission line assembly 300. The example clamp member 310 has a c-shaped inner shell 312 that is connected to a c-shaped outer shell 314 by multiple spokes 316. The inner shell 312 has an inner diameter larger than the outer diameter of the inner tube 302. Thus, the inner shell 312 surrounds the inner tube 302. The inner shell 312 has an axial thickness to prevent the clamp member 310 from wobbling. For example, the inner shell 312 can protrude axially beyond a spoke (e.g., on one side or on both sides). The outer shell 314 has an outer diameter smaller than the inner diameter of the outer tube 304. Thus, the outer shell 314 supports the outer tube 304.

The spokes 316 connect the inner shell 312 to the outer shell 314 and provide space for leaked fluid in the outer tube 304 to flow past the clamp member 310. The spokes 316 are arranged on an inner surface of the outer shell 314 and protrude from the inner surface toward a center of the outer shell 314. The inner shell 312 is attached to the outer shell 314 by the ends of multiple spokes 316 near the center of the outer shell 314. In some implementations, the inner shell 312 is not present and the ends of the spokes 316 support the inner tube 302. The example clamp member 310 has three spokes 316 spaced apart, but in other implementations more or fewer spokes 316 can be used. Any number of spokes can be arranged on the inner shell as long as sufficient space is available for the leaked fluid to flow past the clamp member 310. For example, the spokes 316 can be positioned equidistantly around the inner shell 312 and outer shell 314. The thickness of the outer shell 314 can be made sufficiently thin to prevent significant amounts of fluid from pooling at the outer shell 314 within the outer tube 304. The axial width of the inner shell 312 is substantially equal to the axial width of each spoke 316. In some implementations, the inner shell 312 protrudes, and consequently has thickness in the axial direction to form a sleeve around the inner tube 302 which can prevent the clamp member 310 from rocking or tilting with respect to the inner tube 302. In these implementations, the axial width of the inner shell 312 is greater than the axial width of the spokes 316.

Figure 5:
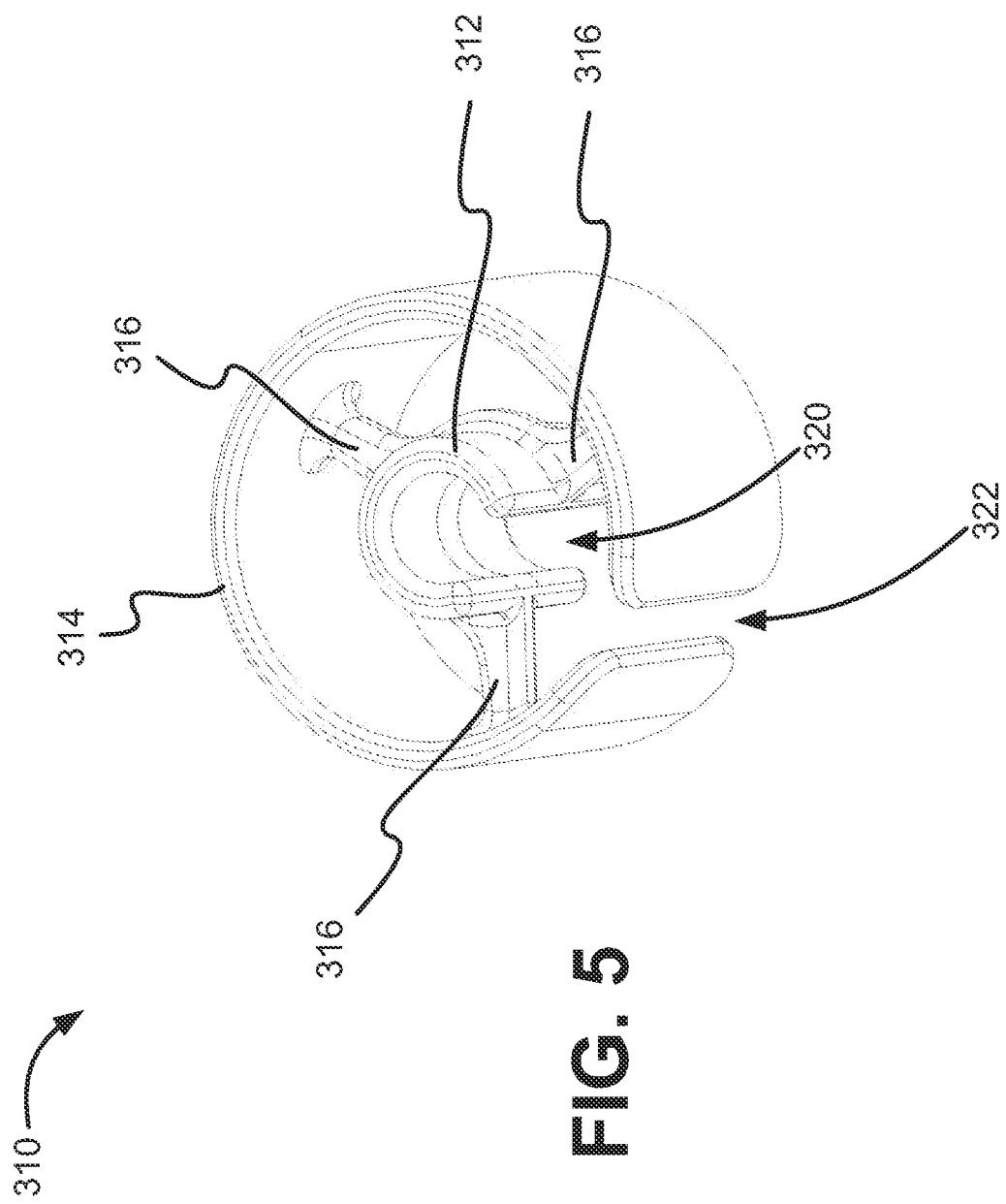
FIG. 5 is a schematic diagram of an example of the clamp member.

FIG. 5 shows an example clamp member 310. The example inner shell 312 has a gap 320 between the spaced apart edges of the inner shell 312, which is less than an outer diameter of the inner tube 302 (not shown) such that the inner tube can be securely inserted into the center of the inner shell 312 through the gap 320 with force but cannot easily be removed. In other implementations, the inner shell 312 has multiple gaps 320. When the outer clamp 306 (not shown) is positioned and tightened, the size of the gap 320 decreases, tightening the clamp member 310 over the inner tube 302. The outer shell 314 can be a cylindrical shape (as shown) or another shape. The cross-section of the outer shell 314 can be substantially similar to that of the outer tube 304 (not shown). The outer shell 314 includes a gap 322 that is sized to accept the inner tube 302. The gap 322 of the outer shell 314 can be greater than or less than an outer diameter of the inner tube 302. The clamp member 310 can be oriented such that the gap 322 in the outer shell 314 provides a space for fluid to flow unimpeded through the clamp member 310. In other implementations, the outer shell 314 has multiple gaps 322 to facilitate fluid flow. The corners and spaced apart edges of the gaps 320, 322 can be chamfered to facilitate insertion of the inner tube 302. In other implementations, the inner shell 312 or the outer shell 314 have no gaps 320, 322. In some implementations, the clamp member 310 and outer clamp 306 can be used to secure the ends of two inner tubes 302 inside a single outer tube 304. In this implementation, the clamp member 310 can have two sets of spokes 316 that are arranged to receive the two inner tubes 302.

A number of implementations have been described. Nevertheless, it will be understood that various modifications may be made without departing from the spirit and scope of the disclosure.

What is claimed is:

1. An aircraft fuel line assembly clamp member, the clamp member comprising:
   a c-shaped outer shell sized to be positioned within an outer tube of an aircraft fuel line assembly and including a first edge and a second edge defining a first gap;
   a plurality of spokes arranged on an inner surface of the outer shell, the plurality of spokes protruding from the inner surface towards a center of the outer shell to define a shape to receive an inner tube of the aircraft fuel line assembly, the plurality of spokes spaced apart on the inner surface, wherein a space between spaced apart edges of the outer shell is less than an outer diameter of the inner tube of the aircraft fuel line assembly;
   a c-shaped inner shell attached to ends of the plurality of spokes near the center of the outer shell and including a first edge connected to one of the plurality of spokes and a second edge connected to another of the plurality of spokes, wherein the first edge of the c-shaped outer shell, the first edge of the c-shaped inner shell, and the one of the plurality of spokes defines a first space, and the second edge of the c-shaped outer shell, the second edge of the c-shaped inner shell, and the another of the plurality of spokes defines a second space; and
   wherein an axial width of the inner shell is substantially equal to or greater than an axial width of each spoke of the plurality of spokes, and an axial width of the outer shell is greater than the axial width of each spoke of the plurality of spokes.

2. The clamp member of claim 1, wherein a space between spaced apart edges of the inner shell is less than an outer diameter of the inner tube of the aircraft fuel line assembly.

3. The clamp member of claim 1, wherein corners of the spaced apart edges of the inner shell are chamfered.

4. The clamp member of claim 1, wherein the axial width of the inner shell is substantially equal to the axial width of outer shell.

5. The clamp member of claim 1, wherein the axial width of the inner shell is greater than the axial width of each spoke of the plurality of spokes, and wherein the inner shell protrudes axially beyond each spoke of the plurality of spokes on one side or both sides of each spoke of the plurality of spokes, and prevents rocking, tilting or wobbling of the clamp member with respect to the inner tube.

6. The clamp member of claim 1, wherein corners of the spaced apart edges of the outer shell are chamfered.

7. The clamp member of claim 1, wherein the plurality of spokes includes at least three spokes.

8. The clamp member of claim 1, wherein the plurality of spokes are positioned equidistant from each other.

9. The clamp member of claim 1, further comprising an outer clamp to be positioned on an outer surface of the outer tube of the aircraft fuel line assembly proximate to the clamp member such that the outer clamp secures the outer tube to the outer shell of the clamp member.

10. An aircraft fuel line assembly comprising:
an inner tube to transport fuel;
an outer tube positioned around the inner tube, the outer tube to transport fuel that leaks from the inner tube; and
a clamp member to receive the inner tube and positioned within the outer tube, the clamp member defining a space to flow the fuel that leaks from the inner tube into the outer tube, wherein the clamp member comprises:
a c-shaped outer shell sized to be positioned within an outer tube of an aircraft fuel line assembly and including a first edge and a second edge defining a first gap;
a plurality of spokes arranged on an inner surface of the outer shell, the plurality of spokes protruding from the inner surface towards a center of the outer shell to define a shape to receive an inner tube of the aircraft fuel line assembly, the plurality of spokes spaced apart on the inner surface, wherein a space between spaced apart edges of the outer shell is less than an outer diameter of the inner tube;
a c-shaped inner shell attached to ends of the plurality of spokes near the center of the outer shell and including a first edge connected to one of the plurality of spokes and a second edge connected to another of the plurality of spokes, wherein the first edge of the c-shaped outer shell, the first edge of the c-shaped inner shell, and the one of the plurality of spokes defines a first space, and the second edge of the c-shaped outer shell, the second edge of the c-shaped inner shell, and the another of the plurality of spokes defines a second space; and
wherein an axial width of the inner shell is substantially equal to or greater than to an axial width of each spoke of the plurality of spokes, and an axial width of the outer shell is greater than the axial width of each spoke of the plurality of spokes.

11. The aircraft fuel line assembly of claim 10, further comprising a c-shaped inner shell attached to ends of the plurality of spokes near the center of the outer shell.

12. The aircraft fuel line assembly of claim 11, wherein a space between spaced apart edges of the inner shell is less than an outer diameter of the inner tube of the aircraft fuel line assembly, and wherein corners of the spaced apart edges of the inner shell are chamfered.

13. The aircraft fuel line assembly of claim 10, wherein the plurality of spokes includes at least three spokes positioned equidistant from each other.

14. The aircraft fuel line assembly of claim 10, further comprising an outer clamp positioned on an outer surface of the outer tube of the aircraft fuel line assembly proximate to the clamp member such that outer clamp secures the outer tube to the outer shell of the clamp member.

15. An aircraft fluid transportation line assembly comprising:
an inner tube to transport aircraft fluid;
an outer tube positioned within the inner tube, the outer tube to transport aircraft fluid that leaks from the inner tube; and
a clamp member to receive the inner tube and positioned within the outer tube, the clamp member defining a space to flow the aircraft fluid that leaks from the inner tube into the outer tube, wherein the clamp member comprises:
a c-shaped outer shell sized to be positioned within the outer tube and including a first edge and a second edge defining a first gap;
a plurality of spokes arranged on an inner surface of the outer shell, the plurality of spokes protruding from the inner surface towards a center of the outer shell to define a shape to receive the inner tube, the plurality of spokes spaced apart on the inner surface, wherein a space between spaced apart edges of the outer shell is less than an outer diameter of the inner tube;
a c-shaped inner shell attached to ends of the plurality of spokes near the center of the outer shell and including a first edge connected to one of the plurality of spokes and a second edge connected to another of the plurality of spokes, wherein the first edge of the c-shaped outer shell, the first edge of the c-shaped inner shell, and the one of the plurality of spokes defines a first space, and the second edge of the c-shaped outer shell, the second edge of the c-shaped inner shell, and the another of the plurality of spokes defines a second space;
wherein an axial width of the inner shell is substantially equal to or greater than to an axial width of each spoke of the plurality of spokes, and an axial width of the outer shell is greater than the axial width of each spoke of the plurality of spokes; and
an outer clamp positioned on an outer surface of the outer shell over the outer tube.

16. The aircraft fluid transportation line assembly of claim 15, wherein the outer clamp is positioned proximate to the clamp member such that the outer clamp secures the outer tube to the outer shell of the clamp member.

17. The aircraft fluid transportation line assembly of claim 15, wherein the axial width of the inner shell is substantially equal to the axial width of outer shell.

18. The aircraft fluid transportation line assembly of claim 15, wherein the axial width of the inner shell is greater than the axial width of each spoke of the plurality of spokes, protrudes axially beyond each spoke of the plurality of spokes on one side or both sides of each spoke of the plurality of spokes, and prevents rocking, tilting or wobbling of the clamp member with respect to the inner tube.

19. The aircraft fuel line assembly of claim 10, wherein the axial width of the inner shell is substantially equal to the axial width of outer shell.

20. The aircraft fuel line assembly of claim 10, wherein the axial width of the inner shell is greater than the axial width of each spoke of the plurality of spokes, protrudes axially beyond each spoke of the plurality of spokes on one side or both sides of each spoke of the plurality of spokes, and prevents rocking, tilting or wobbling of the clamp member with respect to the inner tube.

* * * * *